R. E. HELLMUND.
SYSTEM OF CONTROL.
APPLICATION FILED AUG. 7, 1917.
1,318,754.
Patented Oct. 14, 1919.
2 SHEETS—SHEET 2.
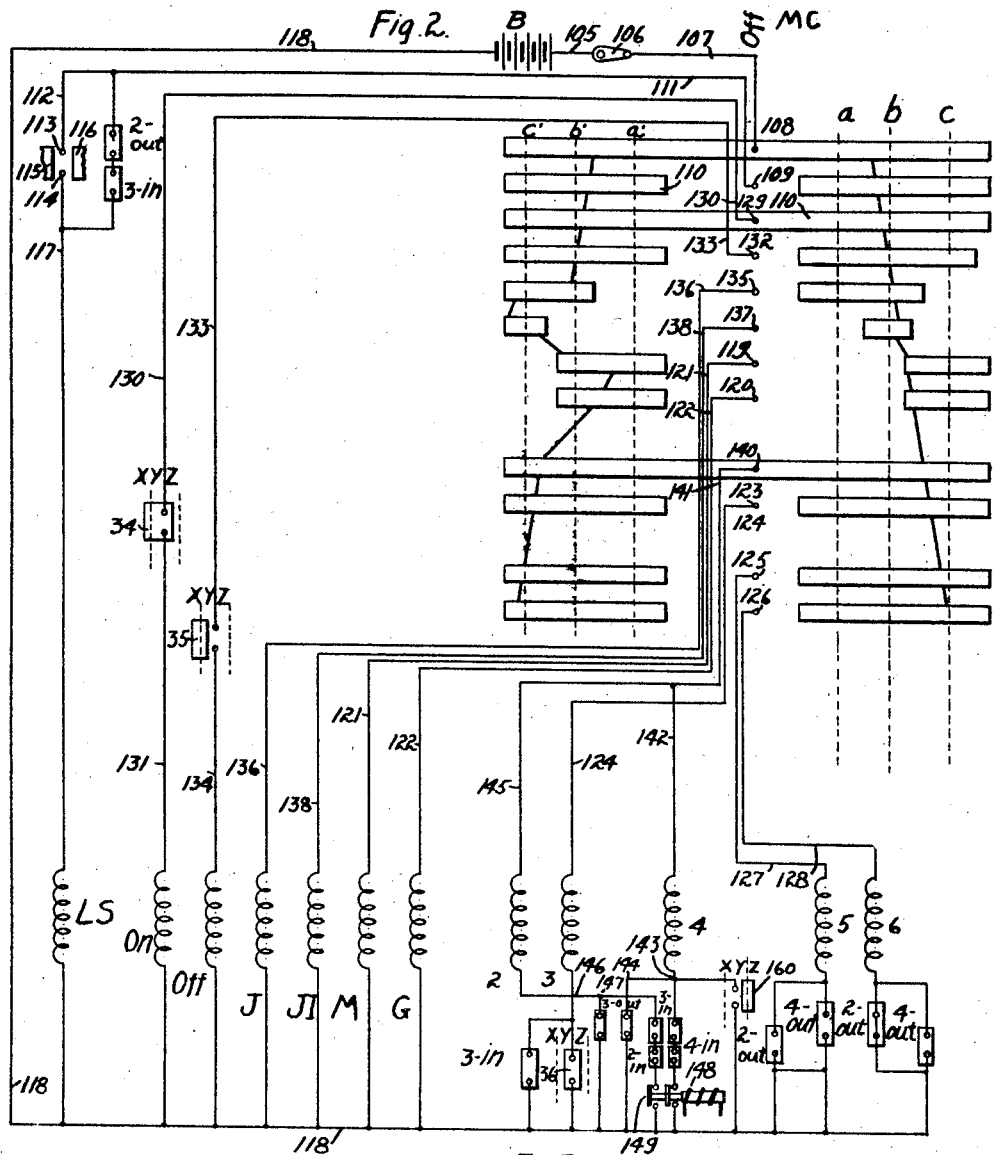
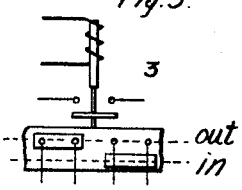
WITNESSES:
T. R. Krear
W. R. Coley
INVENTOR
Rudolf E Hellmund
BY
Wesley G. Carr
ATTORNEY

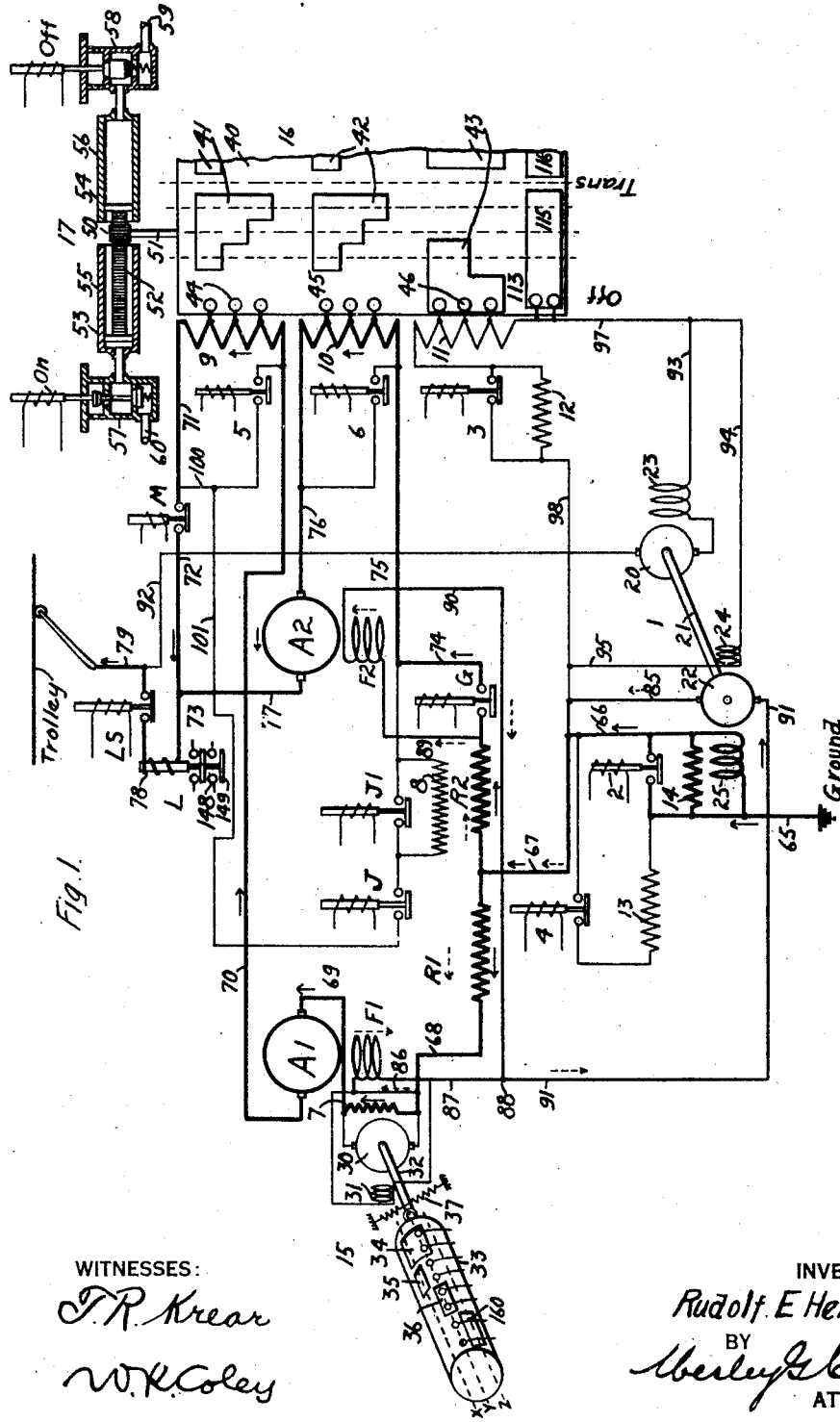

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,318,754.        Specification of Letters Patent.        Patented Oct. 14, 1919.

Application filed August 7, 1917. Serial No. 184,799.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control and especially to certain automatic operating features for governing the operation of electric vehicle motors and the like.

In regenerative control systems for direct-current motors, the field windings are usually excited from an external source, for well-known reasons. However, such circuit connections, at times, produce undesirable armature-current conditions which it has been proposed to eliminate or avoid in various systems of the prior art: see, for example, my copending application Serial No. 171,166, filed May 26, 1917.

While such prior systems fulfilled the intended purpose, in so far as single vehicles were concerned, the operation was not entirely satisfactory in the case of locomotives hauling trains of vehicles. In this case the "slack" should always be taken up gradually in order to prevent the breakage of car-couplings, etc., thus requiring only small motor torques at the beginning of accelerating or regenerative operation and necessitating full-torque conditions after the train is completely under the control of the governing system.

The object of my present invention, therefore, is to provide a relatively simple and reliable control system for automatically effecting initial accelerating or regenerative conditions, with small machine torques, to properly take up the "slack" in the trailing train and for further effecting connection of the machine to the supply circuit for either type of operation, with a minimum of delay, the system being also adapted to prevent excessive torque or regenerated currents after the "slack" has been taken up and the train is in full operation.

My invention may best be understood by reference to the accompanying drawings, wherein Figure 1 is a diagrammatic view of the main circuits of a system of control embodying the invention; Fig. 2 is a diagrammatic view of an auxiliary control system for governing the main-circuit connections of Fig. 1; and Fig. 3 is a detail diagrammatic view of one of the unit switches that is illustrated in Fig. 1.

Referring to Fig. 1 of the drawing, the system shown comprises suitable supply-circuit conductors "Trolley" and "Ground"; a plurality of main dynamo-electric machines respectively having commutator-type armatures A1 and A2 and field windings F1 and F2 of the series type; a motor-generator set 1 that is driven from the supply circuit for the purpose of furnishing exciting energy to the main field windings; a plurality of switches 2, 3, 4, 5, 6, LS, J, J1, M and G for governing various circuit connections, as hereinafter traced in detail; a plurality of circuit resistors R1, R2 and 7 to 14, inclusive, that are associated with the several machine circuits in a manner to be described; a low-current relay L; a regulating relay device 15 of the torque-motor type; and a control apparatus 16 that is governed by an actuating mechanism 17 for varying the active circuit value of the resistors 9, 10 and 11, for purposes to be set forth.

The motor-generator set 1 is shown as comprising a driving or motor armature 20 which is mechanically coupled through a shaft 21, for example, with an exciting or generating armature 22. A series-related field winding 23 is provided for the auxiliary driving armature 20, while a plurality of suitable field windings 24 and 25, which are respectively energized in accordance with the auxiliary driving motor current and the total main-machine current serve to excite the auxiliary generating armature 22, the field windings 24 and 25 being cumulatively related during the regenerative period.

The resistor 14 is connected in permanent shunt relation to the field winding 25, which is adapted to be completely short-circuited by the closure of switch 2 or partially short-circuited through the resistor 13 by the closure of switch 4. The resistors 11 and 12 are connected in series relation across the other field winding 24 for the auxiliary generating armature 22, the resistor 11 being varied in accordance with the position of the control apparatus 16, while the resistor 12 is short-circuited whenever the switch 3 is closed. By varying the combined active-circuit value of the resistors 11 and 12, the excitation that is supplied by the auxiliary field winding 24 is correspondingly changed, whereby the voltage delivered by the auxiliary generating armature 22 to the main field windings may be gradually increased to compensate for the decrease of main-machine speed during the retardation period.

The resistance 8 is connected in series relation with the switch J and in parallel relation to the switch J1, while the resistors 9 and 10 are short-circuited upon the closure of switches 5 and 6, respectively.

The resistor 7 is connected in series relation with the main armature A1 and serves the purpose of a current shunt with respect to the torque relay device 15, which comprises a commutator-type armature 30 that is connected across the resistor 7 and an exciting field winding 31 that is energized in accordance with the voltage of the main field winding F1. The operating shaft 32 of the relay armature 30 is also provided with a small drum controller 33 which carries a plurality of suitably configured contact segments 34, 35, 36 and 160 for bridging certain sets of stationary control fingers to complete auxiliary-circuit connections, as is subsequently traced in detail in connection with Fig. 2. The drum 33 is normally maintained in its illustrated intermediate position $y$ through the agency of suitable centering springs 37 and is adapted to occupy positions $x$ and $z$ on opposite sides of the intermediate position $y$ in accordance with the oscillation of the relay armature 30.

The control apparatus 16 comprises preferably a main drum controller 40 upon which is mounted a plurality of suitable sets of contact segments 41, 42 and 43 for varying the active circuit value of the resistors 9, 10 and 11 through the medium of suitable control fingers or stationary contact members 44, 45 and 46, respectively. The drum 40 is further provided with certain auxiliary-circuit contact members, the purpose of which will be set forth in connection with Fig. 2.

The actuating mechanism 17 is of a familiar electrically-controlled, pneumatically-operated type comprising a pinion 50 which is rigidly secured to one end of the drum-controller shaft 51 to mesh with a horizontally-movable rack member 52, the opposite ends of which constitute pistons 53 and 54 that travel within suitable operating cylinders 55 and 56, respectively. A normally closed valve 57, having an actuating coil "On", is associated with the outer end of the cylinder 55, while a normally open valve 58, having an actuating coil "Off", normally effects communication between an inlet pipe or passage 59 and the outer end of the cylinder 56. The closed valve 57 is of the cylinder 56. The closed valve 57 is provided with a similar inlet pipe 60, and fluid pressure from any suitable source (not shown) may be conveyed to the inlet pipes 59 and 60.

The mechanical operation of the apparatus just described may be set forth as follows: Normally, the admission of fluid pressure to the cylinder 56 biases the mechanism toward the illustrated position. However, upon concurrent energization of the actuating coils "On" and "Off", the initial unbalanced fluid-pressure conditions are reversed, that is, pressure is admitted through the valve 57 to the cylinder 55 and is released from the cylinder 56 through the valve 58 to the atmosphere, whereby movement of the pistons toward the right ensues.

To arrest such movement at any time, it is merely necessary to deënergize the "off" coil, whereupon balanced high-pressure conditions obtain in the operating cylinders 55 and 56, and a positive and reliable stoppage of the actuating mechanism is effected. To produce a return movement of the device, the actuating coils "On" and "Off" are concurrently deënergized, whereby fluid-pressure conditions revert to the original unbalanced state and the desired backward movement is effected.

Assuming, by way of example, that regenerative operation has been inaugurated in any suitable manner, with the main machines connected in parallel relation, as is customary under relatively high-speed conditions, the main armature or regenerative circuit, indicated by the solid arrows, is established from the supply conductor "Ground" through conductors 65, where the circuit divides into four possible branches, namely, the exciting field winding 25 for the auxiliary generating armature 22, the resistor 14, the switch 2, and the switch 4 and resistor 13. Normally, however, switches 2 and 4 are open and, consequently, circuit is continued from one junction-point of the field winding 25 and the resistor 14 through conductors 66 and 67 where the circuit again divides, one branch including stabilizing resistor R1, conductor 68, shunting resistor 7, conductor 69, main armature A1, conductor 70, the variable resistor 9, conductor 71 or the switch 5 and conductor 100, as the case may be, switch M and conductor 72 to a juncture-point 73, and the other branch traversing stabilizing resistor R2, switch G, conductors 74 and 75, variable resistor 10 or short-circuiting switch 6, as conditions determine, conductor 76, main armature A2 and conductor 77 to the junction-point 73, whence circuit is completed through the actuating coil 78 of the low-current relay L, line switch LS and conductor 79 to the supply conductor Trolley.

The exciting or main-field-winding circuit, indicated by the dotted arrows, is established from the positive terminal of the auxiliary generating armature 22 through conductors 85 and 67 where the circuit divides, one branch traversing stabilizing resistor R1, conductors 68 and 86, main field winding F1 and conductor 87 to a junction-point 88, and the other branch including stabilizing resistor R2, conductor 89, main field winding F2 and conductor 90 to the junction-point 88, whence circuit is completed through conductor 91 to the negative terminal of the auxiliary exciting armature 22.

An auxiliary circuit is completed from the trolley through conductors 79 and 92, auxiliary driving armature 20 and its field winding 23, conductors 93 and 94, field winding 24 for the auxiliary generating armature 22 and conductor 95 to the conductor 66, whence circuit is completed to the supply conductor Ground, as previously traced. A shunting circuit for the exciting field winding 24 serves to connect the conductors 94 and 95 through conductor 97, variable resistor 11, resistor 12 or switch 3, as the case may be, and conductor 98.

As previously mentioned, by suitable manipulation of the variable resistor 11, in this case, a gradual increase of the active value thereof, the voltage delivered by the auxiliary armature 22 to the main field windings may be increased to compensate for the gradual decrease of main-machine speed during the braking period, and such action is accomplished in the present case through the automatic operation of the torque relay device 15, as is subsequently described in detail. When the main-machine speed has decreased to a value that is suitable for series-connected operation of the main armatures A1 and A2, the main control drum 40 is actuated through its transition position and the switch J is closed just prior to the opening of the switches M and G, thereby effecting the well-known "bridging" type of transition of the main armatures to series relation, the main-field-winding connections being unchanged.

Under such conditions, the main-armature or regenerative circuit is established from the supply conductor Ground through the main armature A1 to the conductor 71, as previously traced in connection with parallel-machine operation, whence circuit is completed through conductors 100, 101, switch J, transition resistor 8, conductor 75, variable resistor 10 or short-circuiting switch 6, conductor 76 and thence, through main armature A2, to the trolley as already traced.

Referring to the auxiliary-circuit connections of Fig. 2 for effecting the above-described main-circuit arrangements, the system shown includes a master controller MC that is adapted to occupy a plurality of positions $a$, $b$ and $c$, corresponding to acceleration, when the controller is actuated in the one direction from an intermediate "off" position, and a plurality of operative positions $a'$, $b'$ and $c'$, corresponding to regeneration, when the controller is moved in the opposite direction from the intermediate "off" position. The system further includes various actuating coils for the switches and control apparatus that are shown in Fig. 1, together with coöperating contact members of the torque relay device 15 and of the low-current relay L, and interlocking contact members that are associated with the designated switches in the familiar manner that is fully illustrated in Fig. 3. A battery B, or other suitable source of energy, is provided for energizing the various actuating coils through the master controller MC.

Assuming, by way of illustration, that the master controller has been actuated to its initial regenerative position $a'$, one auxiliary circuit is established from the positive terminal of the battery B through conductor 105, hand-switch 106, conductor 107, control fingers 108 and 109, which are bridged by contact segment 110 of the master controller, conductors 111 and 112, control fingers 113 and 114, which are bridged by contact segment 115 or 116 of the main drum-controller 40 in any position thereof except the transition position, whence the circuit is continued through conductor 117, actuating coil of the line switch LS and conductor 118 to the negative battery terminal.

A further circuit is simultaneously completed from the contact segment 110 through control fingers 119 and 120 and conductors 121 and 122 to the actuating coils of the parallel-connecting switches M and G, respectively, whence circuit is completed through the negative battery conductor 118.

Another circuit is also established from the contact segment 110 through control finger 123, conductor 124, the actuating coil of the switch 3, and movable contact member 36 of the torque relay device 15, when occupying its normal intermediate position, to the negative battery conductor 118. Upon the closure of switch 3, a "holding circuit" therefor is formed by the bridging of the movable contact member 36 by an interlock 3—in, whereby the switch remains closed throughout the machine-operating period, irrespective of further movements of the torque relay 15.

The actuating coils of the switches 2 and 4 are connected to the master controller contact segment 110 at all times, as hereinafter traced in detail, but their circuits are normally completed, in the case of the switch 2, only when the switch 3 occupies its open position and, in the case of the switch 4, also whenever the torque relay device 15 occupies its position $z$. Since the switches 2 and 4 are thus normally open, further circuits are completed from the contact segment 110 of the master controller in its initial regenerative position $a'$ through control fingers 125 and 126 which are respectively connected through conductors 127 and 128 to the actuating coils of the switches 5 and 6, whence circuits are completed through sets of parallel-related interlocks 2—out and 4—out to the negative battery conductor 118. The main-armature-circuit resistors 9 and 10 are thus short-circuited in the operative positions of the master controller, provided that the switches 2 and 4 are not closed.

Additional auxiliary circuits are established from the contact segment 110 through control finger 129, conductor 130, movable contact member 34 of the torque relay device 15 in either of its positions $x$ and $y$, conductor 131 and the actuating coil "On" to the negative conductor 118; also through control finger 132, conductor 133, movable contact member 35 of the torque relay device 15, when occupying its position $x$, conductor 134, and actuating coil "Off" to the negative battery conductor.

Assuming that normal operation of the control apparatus 16 has occurred, in the previously-described manner, to gradually increase the active-circuit value of the variable resistor 11 and thus increase the delivered voltage of the auxiliary generating armature 22, by reason of the cumulative relation of the exciting field windings 24 and 25, until main-machine-speed conditions are suitable for transition to the series relation of the main armatures, the master controller MC may be actuated to its position $b'$, whereby one new circuit is completed from the contact segment 110 through control finger 135, conductor 136 and the actuating coil of the switch J to the negative conductor 118. Upon further controller movement to position $c'$, the switches M and G are opened by reason of the disengagement of the contact segment 110 from the control fingers 119 and 120, and, in the final position $c'$, a new circuit is completed from the contact segment 110 through control finger 137, conductor 138 and the actuating coil of the switch J1 to the negative battery conductor. In this way, the transition resistor 8 is short-circuited and series connection of the main armatures obtains, as previously traced in connection with Fig. 1.

As mentioned above, the switches 2 and 4 are open, while the switch 3 is closed during normal regenerative operation of the system. In this way, the combined field excitation of the auxiliary generating armature 22 that is provided by the cumulatively-related field windings 24 and 25 is such that the main machines have a relatively "flat" speed-current characteristic; that is, a considerable variation of main-armature current is accompanied by a relatively small change of machines speed.

Whenever the master controller is moved from any of its operative positions during either acceleration or regeneration to the "off" position, which corresponds to coasting of the vehicle, the following conditions obtain: The main control drum 40 remains in whatever position it happens to occupy, while switch 3 is opened to insert the resistor 12 in circuit with the resistor 11 across the exciting field winding 24 for the auxiliary generating armature 22; switches 4 and 2 are closed in that order for a purpose to be set forth, and switches 5 and 6 are opened to insert certain portions of the variable resistors 9 and 10, as determined by the position of the main control drum 16, in the main-armature circuits.

Such conditions are accomplished in the following manner: the actuating coil "On" continues to be energized in the "off" position of the master controller by reason of the maintenance of contact between the control finger 129 and the contact segment 110, while the actuating coil "Off" is deënergized, since the torque relay device 15 occupies its illustrated intermediate position. The high-pressure balanced conditions in the actuating mechanism 17 thus maintain the main control drum 40 in whatever position it happens to occupy when the master controller is actuated to its "off" or coasting position.

Furthermore, one new circuit is established from the contact segment 110 through control finger 140, conductors 141 and 142, actuating coil of the switch 4, junction-point 143, conductor 144 and interlock 3—out to the negative conductor 118. A branch circuit is completed from the conductor 141 through conductor 145, actuating coil of the switch 2, conductor 146, junction-point 147, and interlock 3—out to the negative conductor 118.

Upon the closure of switches 2 and 4, the energizing circuits of the actuating coils for the switches 5 and 6 are deënergized by reason of the exclusion therefrom of the interlocks 2—out and 4—out, whereby the main-circuit resistors 9 and 10 are rendered active.

Upon movement of the master controller to an operating position during such coasting period, the line switch LS will be closed in the previously described manner, while a relatively high voltage will be delivered to the main field windings from the auxiliary generating armature 22, irrespective of the position of the main control drum 40 by reason of the previously described open condition of the switch 3 which inserts the resistor 12 in the shunt circuit around the exciting field winding 24, thus preventing the current in the field winding 24 from being shunted to any great extent. However, an undesirable surge of accelerating or regenerative current is prevented by reason of the short-circuit of the exciting field winding 25 by the previously-described closure of the switches 4 and 2, under which conditions, the excitation characteristics of the system are such that a relatively "steep" speed-current curve represents the operation of the main machines; that is, a relatively great change in speed is accompanied by only a small variation of main-armature current. Furthermore, certain portions of the main-circuit resistors 9 and 10 are also initially included in circuit, since the switches 5 and 6 are open, to aid in the prevention of a current surge.

The torque relay device 15 which, by reason of the energization of its movable and stationary elements in accordance with the main-armature current and main-field-winding voltage, respectively, is adapted to operate substantially in accordance with the main-machine torque conditions, will subsequently oscillate from the one to the other of its several positions to effect corresponding movement of the main control drum 40. Thus, in the illustrated normal or intermediate position of the relay device, the actuating coil "On" is energized through the contact member 34, while the actuating coil "Off" is deënergized and, consequently, no movement of the main control drum occurs, since the fluid-pressure conditions in the actuating mechanism 17 are balanced. Upon a reduction of main-machine regenerative torque, however, or, strictly speaking, upon an instantaneous flow of accelerating current, the relay device armature 30 will actuate the small control drum 33 to its position $x$, whereby the actuating coil "Off" is also energized, and forward movement of the main control drum 40 ensues to gradually increase the active value of the variable resistor 11 and thus indirectly augment the main-field-winding excitation and correspondingly increase the main-machine torque. On the other hand, in the event of a certain increase of main-machine torque, the relay device armature 30 is actuated in the opposite direction to move the drum 33 to its position $z$, wherein the actuating coils "On" and "Off" are both deënergized, and backward movement of the main control drum 40 takes place to gradually short-circuit more and more of the variable resistor 11 and thus decrease the main-machine torque.

After the preliminary movements of the torque relay device 15 to stabilize machine-circuit conditions, the relay device will assume its neutral position to permit the closure of the switch 3 through the movable contact segment 36 of the drum 33, the switch being maintained in its closed position through the "holding" interlock 3—in, as previously described. In case further circuit adjustment is necessitated by the closure of switch 3, the torque relay device 15 will automatically effect such adjustment, and, at that time, the main-armature current will decrease to a relatively low value by reason of the stable machine conditions.

Upon the closure of switch 3, the previously-traced energizing circuits of the actuating coils for switches 2 and 4 are interrupted, but the closure of these switches is temporarily maintained by the formation of a pair of similar "holding circuits" which respectively extend from the actuating coil of switch 4 through junction-point 143, interlocks 3—in and 4—in and upper bridging contact member 148 of the low-current relay L to the negative battery conductor 118 and from the actuating coil of switch 2 through junction-point 147, interlocks 3—in and 2—in and lower bridging contact member 149 of the low-current relay L to the negative conductor. Upon the establishment of the above-mentioned stable machine conditions, the low-current relay L will drop to its lower position to permit the opening of the switches 2 and 4. These switches will thereafter remain open, irrespective of the operation of the low-current relay L, by reason of the exclusion from their actuating-coil circuits of the previously-mentioned interlocks 2—in and 4—in.

In these ways, the "slack" of a trailing train is automatically gradually taken up by the small machine torques or currents at the beginning of an operating period, and subsequently, full-torque machine conditions are automatically exerted, that is, after stable main-machine excitation conditions obtain.

Whenever the main control drum 40 is passing its transition position, the line switch LS is opened by reason of the interruption of its actuating-coil circuit through contact segment 115 or segment 116 of the main control drum, unless switch 3 is closed and switch 2 is open, in which case, conductors 118 and 117 are bridged by interlocks 2—out and 3—in, and the above-mentioned interruption of the actuating-coil circuit for the line switch has no effect upon the switch.

Furthermore, in the event of a relatively heavy main-armature current which causes the torque relay device 15 to shift to its position $z$, a movable contact segment 160 of the drum 33 connects junction-point 143 to negative conductor 118, whereby the actuating coil for the switch 4 is energized, irrespective of the position of the master controller MC, to further shunt the auxiliary field winding 25 and modify the operating characteristics of the main machines to thus reduce the overload conditions to a certain degree.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a dynamo-electric machine, of means for automatically causing said machine to produce relatively small torques during a preliminary regulating period at the beginning of an operating period and to automatically produce full machine torques subsequently, and means for modifying the machine characteristics under predetermined overload conditions.

2. In a system of control, the combination with a supply circuit and a dynamo-electric machine having an armature and a field winding, of means for separately exciting said field winding, means for connecting the machine to the supply circuit under coasting conditions, irrespective of the condition of the exciting circuit, and means for limiting the machine current to a relatively small value until predetermined exciting-circuit conditions obtain.

3. In a system of control, the combination with a supply circuit and a dynamo-electric machine having an armature and a field winding, of means for separately exciting said field winding, means for varying such excitation in accordance with predetermined machine conditions, means for connecting the machine to the supply circuit under coasting conditions, irrespective of the condition of the exciting circuit, and means for so regulating machine-circuit conditions in conjunction with said varying means that a relatively small machine current obtains until exciting-circuit conditions have become stable.

4. In a system of control, the combination with a dynamo-electric machine, of means for automatically varying the machine speed, means for automatically producing relatively small torques during a preliminary regulating period at the beginning of an operating period and for automatically producing full machine torques subsequently, and means for modifying the machine characteristics under predetermined overload conditions.

5. In a system of control, the combination with a supply circuit and a dynamo-electric machine having an armature and a field winding, of means for separately exciting said field winding, means for varying such excitation in accordance with predetermined machine conditions, means for connecting the machine to the supply circuit under coasting conditions, irrespective of the condition of the exciting circuit, means for so regulating machine-circuit conditions in conjunction with said varying means that a relatively small machine current obtains until exciting-circuit conditions have become stable, and means for "steepening" the machine speed-current characteristic curve under predetermined overload conditions.

6. In a system of control, the combination with a main dynamo-electric machine having an armature and a field winding, of an auxiliary exciting armature for said field winding, a plurality of field windings for said auxiliary armature respectively energized in accordance with the main-armature load and the auxiliary-armature load, means for decreasing the available exciting effect of said main-armature-load excited field winding and for oppositely influencing said auxiliary-armature-load excited field winding under coasting conditions, and means for automatically maintaining such auxiliary-field-winding conditions upon the resumption of main-machine operation until stable excitation conditions for the main field winding obtain.

7. In a system of control, the combination with a main dynamo-electric machine having an armature and a field winding, of an auxiliary exciting armature for said field winding, a plurality of field windings for said auxiliary armature respectively energized in accordance with the main-armature load and the auxiliary-armature load, switching means for shunting said main-armature-load-excited field-winding to decrease its available effect and switching means for shunting said auxiliary-armature-load-excited field-winding to increase its available effect under coasting conditions, and means for automatically maintaining such auxiliary field-winding conditions upon the resumption of main-machine operation until stable excitation conditions for the main field winding obtain.

8. In a system of control, the combination with a main dynamo-electric machine having an armature and a field winding, of an auxiliary exciting armature for said field winding, a plurality of field windings for said auxiliary armature respectively energized in accordance with the main-armature load and the auxiliary-armature load, switching means for shunting said main-armature-load-excited field-winding to decrease its available effect and switching means for shunting said auxiliary-armature-load-excited field winding to increase its available effect under coasting conditions, means for automatically maintaining such auxiliary field-winding conditions upon the resumption of main-machine operation until stable excitation conditions for the main field winding obtain, and means for automatically preventing a predetermined overload current.

In testimony whereof I have hereunto subscribed my name this 30th day of July, 1917.

RUDOLF E. HELLMUND.